United States Patent
Zhou

(10) Patent No.: US 9,917,744 B2
(45) Date of Patent: Mar. 13, 2018

(54) METHOD AND SYSTEM FOR MONITORING QUALITY OF DATA TRANSMISSION IN IDC NETWORK

(71) Applicant: TENCENT TECHNOLOGY (SHENZHEN) COMPANY LIMITED, Shenzhen, Guangdong (CN)

(72) Inventor: Dongxiang Zhou, Guangdong (CN)

(73) Assignee: Tencent Technology (Shenzhen) Company Limited (CN)

( * ) Notice: Subject to any disclaimer, the term of this patent is extended or adjusted under 35 U.S.C. 154(b) by 0 days.

(21) Appl. No.: 15/107,072

(22) PCT Filed: Feb. 16, 2015

(86) PCT No.: PCT/CN2015/073202
§ 371 (c)(1),
(2) Date: Jun. 21, 2016

(87) PCT Pub. No.: WO2015/135417
PCT Pub. Date: Sep. 17, 2015

(65) Prior Publication Data
US 2017/0244610 A1    Aug. 24, 2017

(30) Foreign Application Priority Data
Mar. 10, 2014    (CN) .......................... 2014 1 0086058

(51) Int. Cl.
G06F 15/173 (2006.01)
H04L 12/24 (2006.01)
H04L 12/26 (2006.01)

(52) U.S. Cl.
CPC ...... H04L 41/5025 (2013.01); H04L 41/5009 (2013.01); H04L 43/0847 (2013.01); H04L 43/0858 (2013.01)

(58) Field of Classification Search
CPC ............ H04L 41/5025; H04L 41/5009; H04L 43/0847; H04L 43/0858
See application file for complete search history.

(56) References Cited

U.S. PATENT DOCUMENTS 8,619,579 B1 *  12/2013  Rothstein ............. H04L 43/026
370/235
2002/0138610 A1   9/2002  Miyazawa et al.
(Continued)

FOREIGN PATENT DOCUMENTS

| CN | 101990239 A | 3/2011 |
|----|-------------|--------|
| CN | 102065102 A | 5/2011 |

(Continued)

*Primary Examiner* — Jonathan Bui
(74) *Attorney, Agent, or Firm* — Roger D. Emerson; Emerson, Thomson & Bennett

(57) ABSTRACT

A method for monitoring quality of data transmission in an IDC network includes: monitoring data sent by an application service node and data received by a data storage node of the application service node in an IDC network; acquiring index items of sent data and index items of received data; calculating, according to the index items of sent data and the index items of received data, a data transmission quality index of the sent data and the received data; and raising an alarm according to the data transmission quality index. By contrast, transmission of erroneous data that causes a waste of network bandwidth resources can be avoided, and data calculation performed according to the erroneous data resulting in an erroneous data calculation result is further prevented; therefore, occupation of unnecessary calculation resources and a bad decision that is generated according to the erroneous data calculation result can be prevented.

16 Claims, 5 Drawing Sheets

(56) References Cited

U.S. PATENT DOCUMENTS

| | | | |
|---|---|---|---|
| 2008/0080390 A1* | 4/2008 | Ebuchi | H04L 43/12 370/253 |
| 2009/0028144 A1* | 1/2009 | Blair | H04L 43/18 370/389 |
| 2014/0307562 A1* | 10/2014 | Bruckman | H04L 43/0835 370/241.1 |
| 2015/0319064 A1* | 11/2015 | Oishi | H04L 1/1877 370/241.1 |
| 2016/0105353 A1* | 4/2016 | Cociglio | H04L 43/0829 370/252 |
| 2016/0112515 A1* | 4/2016 | Ohara | H04L 67/38 709/203 |

FOREIGN PATENT DOCUMENTS

| | | |
|---|---|---|
| CN | 103001829 A | 3/2013 |
| CN | 104135395 A | 11/2014 |

\* cited by examiner

METHOD AND SYSTEM FOR MONITORING QUALITY OF DATA TRANSMISSION IN IDC NETWORK

CROSS REFERENCE TO RELATED APPLICATION

This application is a continuation of International Application No. PCT/CN2015/073202, filed on Feb. 16, 2015. This application claims the benefit and priority of Chinese Application No. 201410086058.2, filed Mar. 10, 2014. The entire disclosures of each of the above applications are incorporated herein by reference.

FIELD OF THE TECHNOLOGY

The present disclosure relates to the field of network technologies, and in particular, to a method and a system for monitoring quality of data transmission in an Internet data center (IDC) network.

BACKGROUND OF THE DISCLOSURE

An Internet data center is called IDC in short, and is a centralized facility base that provides devices for collecting, storing, processing, and sending data with operation and management. The IDC generally includes multiple servers, for example, an application service node that provide s an application service and a data storage node that stores data.

An existing Internet application service usually relates to multiple IDCs that are separately deployed in different areas. Operation data generated by an application service node in each IDC is first transmitted to a nearby data storage node in the same IDC, so as to prevent a possible transmission timeout and a risk of a data loss among IDC networks. An existing Internet application service (for example, a massively multiplayer online game) usually generates a huge amount of operation data in real time. For some Internet application services, one user client can generate data in a TB scale within one day. To ensure a calculation speed of related data calculation such as subsequent statistics and data mining on such a huge amount of data, application service data in a data storage node in each IDC is further transferred to a data warehouse.

In a transmission process of data, problems such as a data loss and a data transmission error that affect data quality may occur, and the quality of data has a critical effect on the correctness of a data calculation result. An erroneous data calculation result may result in a bad decision that is generated according to the data calculation result. If a data transmission problem occurs in a process of transmitting data from an application service node to a data storage node, the data in which an error has occurred is further transmitted to a data warehouse, which not only wastes network bandwidth resources, but also leads to the generation of an erroneous calculation result.

SUMMARY

Based on this, it is necessary to provide a method for monitoring quality of data transmission in an IDC network that can avoid transmission of erroneous data that causes a waste of network bandwidth resources.

A method for monitoring quality of data transmission in an IDC network includes the following steps:

monitoring data sent by an application service node and data received by a data storage node corresponding to the application service node in an IDC network;

acquiring specified index items of the sent data and specified index items of the received data;

calculating, according to the index items of the sent data and the index items of the received data, a data transmission quality index between the application service node and the corresponding data storage node; and raising an exception alarm according to the data transmission quality index.

In addition, it is further necessary to provide a system for monitoring quality of data transmission in an IDC network that can avoid transmission of erroneous data that causes a waste of network bandwidth resources.

A system for monitoring quality of data transmission in an IDC network includes:

a monitoring module, configured to monitor data sent by an application service node and data received by a data storage node corresponding to the application service node in an IDC network;

an index item acquisition module, configured to acquire specified index items of the sent data and specified index items of the received data;

a quality index calculation module, configured to calculate, according to the index items of the sent data and the index items of the received data, a data transmission quality index corresponding to the sent data and the received data; and an alarm module, configured to raise an exception alarm according to the data transmission quality index.

In the method and system for monitoring quality of data transmission in an IDC network, data sent by an application service node and data received by a corresponding data storage node in an IDC network are monitored, specified index items of the sent data and specified index items of the received data are acquired, a data transmission quality index corresponding to the sent data and the received data is calculated according to the index items of the sent data and the index items of the received data, and an exception alarm is raised according to the data transmission quality index. If the data transmission quality index does not meet a criterion and an exception alarm is generated, it indicates that an error occurs in a process that the data sent by the application service node is transmitted to the data storage node, and the data in which an error has occurred may stop being transmitted to a data warehouse, thereby avoiding transmission of erroneous data that causes a waste of network bandwidth resources, and data calculation performed according to the erroneous data resulting in an erroneous data calculation result is further prevented; not only occupation of unnecessary calculation resources is avoided, but also a bad decision that is generated according to the erroneous data calculation result can be prevented.

DESCRIPTION OF EMBODIMENTS

In order to make the objectives, technical solutions, and advantages of the present disclosure more comprehensible, the present disclosure is described in further detail below with reference to embodiments and the accompanying drawings. It should be understood that, specific embodiments described herein are merely used to explain the present disclosure instead of limiting the present disclosure.

Unless the context clearly indicates otherwise, singular elements or components in the present disclosure may be in the plural and vice versa, which is not limited in the present disclosure. Although steps in the present disclosure are labeled with numbers, such numbers are not intended to limit the order of these steps. Unless the order of steps is explicitly stated or it is explicitly stated that a step needs to be performed on the basis of another step, the relative order of steps can be adjusted. It should be understood that as used herein, the term "and/or" involves and includes any and all combinations of one or more of the associated listed items.

Figure 1:
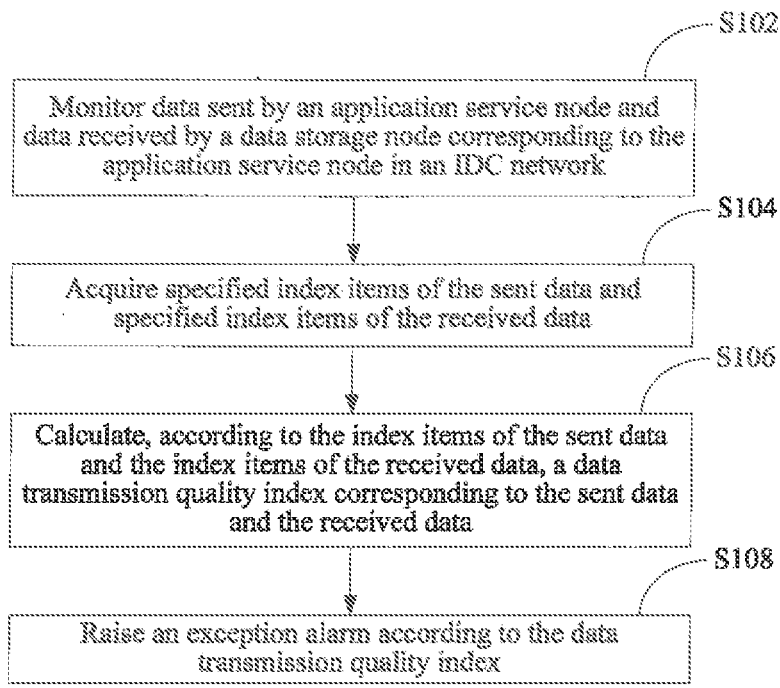
FIG. 1 is a schematic flowchart of a method for monitoring quality of data transmission in an IDC network in an embodiment.

As shown in FIG. 1, in an embodiment, a method for monitoring quality of data transmission in an IDC network includes the following steps:

Step S102: Monitor data sent by an application service node and data received by a data storage node corresponding to the application service node in an IDC network.

An application service node and a data storage node send data to and receive data from each other, and therefore the application service node corresponds to the data storage node.

In an embodiment, scripts may be deployed in advance on the application service node and the corresponding data storage node, data sent by a network transceiver port of the application service node is monitored by using the deployed scripts, and data received by a network transceiver port of the data storage node is monitored by using the deployed scripts. In the following the data that is sent is called sent data in short, and the data that is received is called received data in short.

Step S104: Acquire specified index items of the sent data and specified index items of the received data.

The specified index items may be acquired by using the deployed scripts. Further, in an embodiment, the scripts may send, by using the network transceiver port, the acquired index items to an index calculation server, and step S106 and S108 below may be performed by the index calculation server.

In an embodiment, the index items of the sent data include one or more of a belonging application service node address, a data content type, a data content version, a data serial number, a sending timestamp, the number of pieces of data, and a data amount. The index items of the received data include one or more of a belonging data storage node address, a data content type, a data content version, a data serial number, a receiving timestamp, the number of pieces of data, and a data amount. What content is specifically included in the index items of the sent data and the received data may be decided according to needs in the following specific embodiments. For example, in an embodiment, only the number of pieces of data needs to be used, and it may be regarded that in the embodiment, the index items include the number of pieces of data. In an embodiment, the data content types are categorized into game status data, game log data, payment data, and the like.

In an embodiment, the method for monitoring quality of data transmission in an IDC network further includes a step: detecting a latest data dictionary change event, and updating, if the change event is detected, local data dictionaries on the application service node and the data storage node.

A latest data dictionary change event released by a data map and data dictionary management platform may be detected by using the deployed scripts, so as to ensure that the local data dictionaries on the application service node and the data storage node are latest data dictionaries. Further, the data content type, the data content version, and the like of the sent data and the received data may be acquired from the local data dictionary.

Step S106: Calculate, according to the index items of the sent data and the index items of the received data, a data transmission quality index corresponding to the sent data and the received data.

Step S108: Raise an exception alarm according to the data transmission quality index.

In an embodiment, step S106 includes a step: calculating data transmission integrity according to the number of pieces of data of the sent data and the number of pieces of data of the received data.

A ratio of the number of pieces of data of the received data to the number of pieces of data of the sent data may be calculated and used as the data transmission integrity.

For example, 20 application service nodes provide a game with services and generate data in real time. The number of pieces of data generated by each application service node within a unit time (for example, 1 hour) is 20 million. The application service node sends the generated data to a corresponding data storage node. In a process of transmission, a loss of data may occur for various reasons. If the number of pieces of data received by the data storage node from one application service node within a time period is 19999995, the data transmission integrity from the application service node to the corresponding data storage node within the time period is 19999995/20000000=99.99%. The data transmission integrity from other application service nodes to corresponding data storage nodes may be calculated similarly.

In this embodiment, it may be determined in step S108 whether the data transmission integrity is less than a preset threshold, and if yes, raise an exception alarm.

For example, when the data transmission integrity is less than 90%, an exception alarm may be raised, indicating that data transmission integrity from a corresponding application server to a data storage node within a corresponding time period is relatively low.

In an embodiment, step S106 includes a step: calculating a data transmission delay according to the sending timestamp of the sent data and the receiving timestamp of the received data.

A difference between the receiving timestamp of the received data and the sending timestamp of the sent data may be calculated and used as the data transmission delay.

For example, a sending timestamp of a data block (including multiple pieces of data) of an application service node is 20140307110601 (11:06:01, Mar. 7, 2014), whereas a timestamp when a corresponding data storage node receives the data block is 20140307110705. In this case, a data transmission delay of the data block between the application service node and the corresponding data storage node is: 20140307110705−20140307110601=1 minute and 4 seconds.

In this embodiment, it may be determined in step S108 whether the data transmission delay is longer than a preset threshold, and if yes, raise an exception alarm.

For example, when the data transmission delay is longer than 10 minutes, an exception alarm may be raised, indicating that a data transmission delay from a service node transmitted to a corresponding data storage node is too long.

The index calculation server receives the index items of the sent data on multiple application servers and the index items of the received data in the multiple data storage nodes. The index calculation server may perform comparison and calculation on, among all the sent data and the received data, sent data and received data in which the belonging application service node address corresponds to the belonging data storage node address, the data content types are same, and the data serial numbers are same, so as to obtain the data transmission integrity or the data transmission delay. An application service node and a data storage node send data to and receive data from each other, so that an address of the application service node corresponds to an address of the data storage node. A correspondence between an application service node address and a data storage node address may be stored in advance. The index calculation server may acquire, according to the correspondence, a belonging data storage node address corresponding to a belonging application service node address.

In the method for monitoring quality of data transmission in an IDC network, data sent by an application service node and data received by a corresponding data storage node in an IDC network are monitored, specified index items of the sent data and specified index items of the received data are acquired, a data transmission quality index corresponding to the sent data and the received data is calculated according to the index items of the sent data and the index items of the received data, and an exception alarm is raised according to the data transmission quality index. If the data transmission quality index does not meet a criterion and an exception alarm is generated, it indicates that an error occurs in a process that the data sent by the application service node is transmitted to the data storage node, and the data in which an error has occurred may stop being transmitted to a data warehouse, thereby avoiding transmission of erroneous data that causes a waste of network bandwidth resources, and data calculation performed according to the erroneous data resulting in an erroneous data calculation result is further prevented; not only occupation of unnecessary calculation resources is avoided, but also a bad decision that is generated according to the erroneous data calculation result can be prevented.

Figure 2:
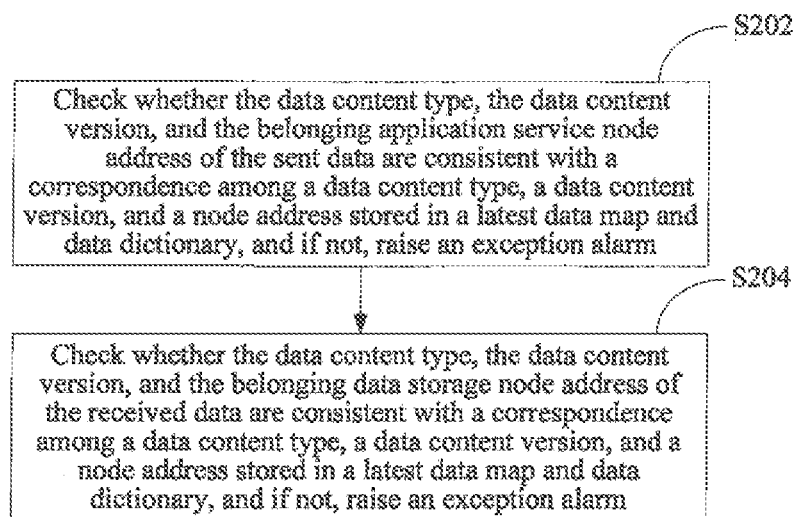
FIG. 2 is a schematic flowchart of a step of checking a type version in an embodiment.

In an embodiment, the method for monitoring quality of data transmission in an IDC network further includes a step of checking a type version, and the step may be performed by the index calculation server. As shown in FIG. 2, the step includes the following steps:

Step S202: Check whether the data content type, the data content version, and the belonging application service node address of the sent data are consistent with a correspondence among a data content type, a data content version, and a node address stored in a latest data map and data dictionary, and if not, raise an exception alarm.

Step S204: Check whether the data content type, the data content version, and the belonging data storage node address of the received data are consistent with a correspondence among a data content type, a data content version, and a node address stored in a latest data map and data dictionary, and if not, raise an exception alarm.

In an embodiment, the latest data map and data dictionary is stored in a data map and data dictionary management platform. A correspondence between a belonging application service node address and a data content type and a correspondence between a belonging data storage node address and a data content type are stored in the data map, and are used to represent a content type of data deployed on each application service node and a content type of data deployed on each data storage node. A correspondence between a data content type and a data content version is stored in the data dictionary, and is used to represent a latest version (data content version) of each data content type.

In step S202, the data map may be searched according to the belonging application service node address of the sent data for a corresponding data content type, and it is found through comparison whether the found data content type and the data content type of the sent data are consistent; and the data dictionary is searched according to the data content type of the sent data for a corresponding data content version, and it is found through comparison whether the found data content version and the data content version of the sent data are consistent. A process of performing step S204 corresponds to that of step S202, and is no longer elaborated here.

In an aspect, versions of Internet application services are updated at a very fast speed, and correspondingly, a correspondence between a latest data content type and a data content version stored in the data dictionary also changes rapidly. In another aspect, the number of the data storage nodes changes with that of the application service nodes, the content types of data deployed on each application service node and each data storage node may also change, and correspondingly, the correspondence between the data content type and the IDC node address stored in the data map may also change often. Therefore, it is very necessary to check whether the data content types, the data content versions, and the corresponding IDC node addresses of the sent data and the received data meet a latest data map and data dictionary. In this embodiment, if the data content type, the data content version, and the corresponding IDC node address of the sent data or the received data do not meet a latest data map and data dictionary, an exception alarm is raised, and further data in which the latest data map and data dictionary is not met may stop being transmitted to a data warehouse, thereby avoiding transmission of erroneous data and saving network bandwidth resources.

Figure 3:
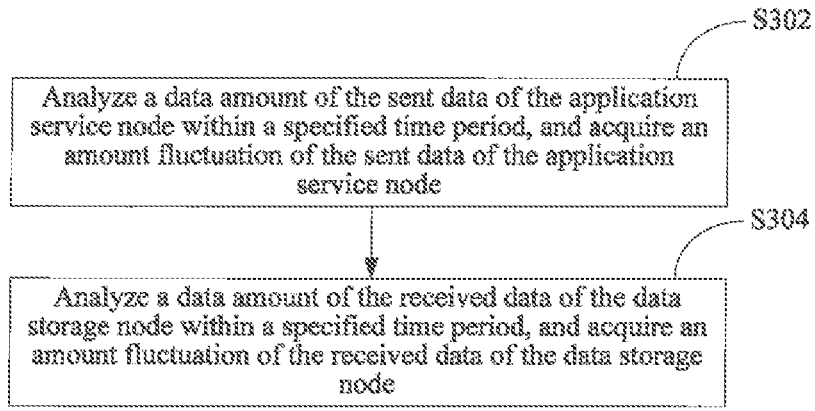
FIG. 3 is a schematic flowchart of a step of analyzing a data amount change in an embodiment.

In an embodiment, the method for monitoring quality of data transmission in an IDC network further includes a step of analyzing a data amount change, and the step may also be performed by the index calculation server. As shown in FIG. 3, the step includes the following steps:

Step S302: Analyze a data amount of the sent data of the application service node within a specified time period, and acquire an amount fluctuation of the sent data of the application service node.

Step S304: Analyze a data amount of the received data of the data storage node within a specified time period, and acquire an amount fluctuation of the received data of the data storage node.

If a data amount of the sent data or the received data of the data storage node of the application service node within a time period has a large fluctuation, an exception problem may exist, a reason why the data amount has a large fluctuation may further be analyzed, and it is determined according to the reason whether to further send corresponding data to a data warehouse, thereby avoiding transmission of data in which an exception occurs and saving network bandwidth resources.

Figure 4:
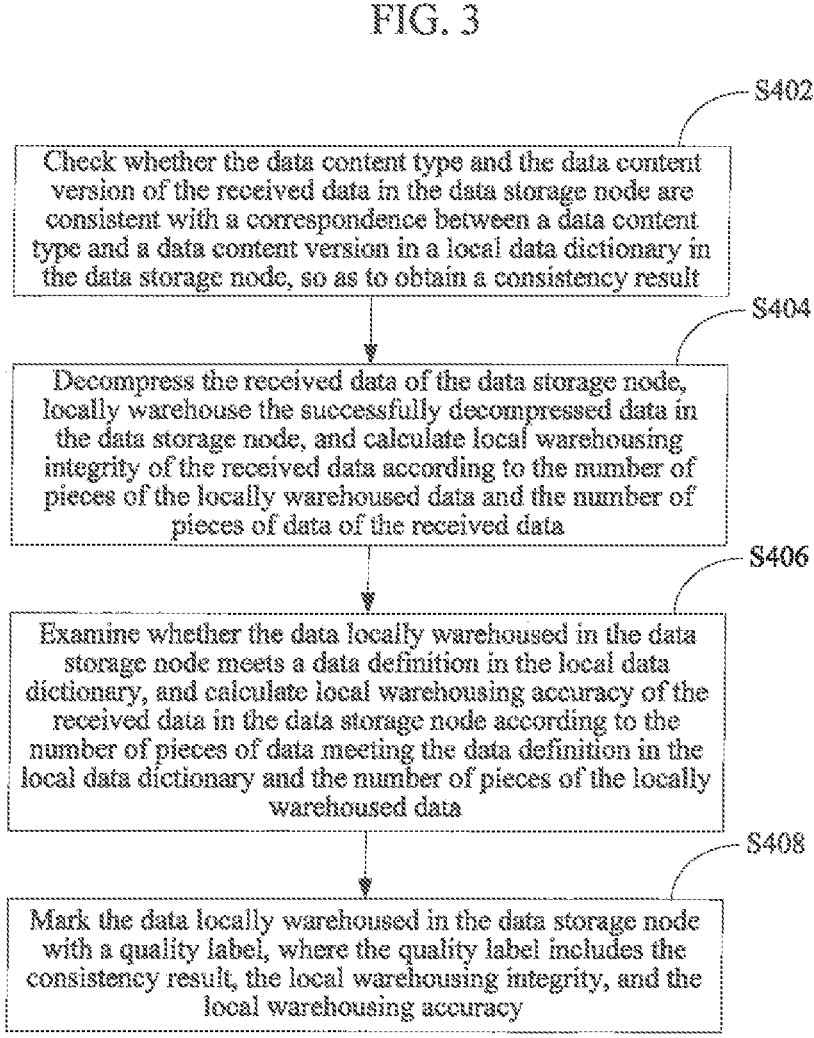
FIG. 4 is a schematic flowchart of a step of local warehousing and marking received data of a data storage node in an embodiment.

In an embodiment, the method for monitoring quality of data transmission in an IDC network further includes a step of local warehousing and marking received data of a data storage node, and the step may be performed by the data storage node. As shown in FIG. 4, the step includes the following steps:

Step S402: Check whether the data content type and the data content version of the received data in the data storage node are consistent with a correspondence between a data content type and a data content version in the local data dictionary on the data storage node, so as to obtain a consistency result.

Step S404: Decompress the received data of the data storage node, locally warehouse the successfully decompressed data in the data storage node, and calculate local warehousing integrity of the received data according to the number of pieces of the locally warehoused data and the number of pieces of data of the received data.

A ratio of the number of pieces of the locally stored data to the number of pieces of data of the received data may be calculated and used as the local warehousing integrity of the received data.

In an embodiment, each piece of data in the received data includes a header and multiple attribute values, and a vertical bar is used to separate the header and the attribute values and separate the attribute values. The header is used to mark the data type, and is used to represent a data table to which the data is to be saved during local storage.

For example, the following two segments of data separately represent two pieces of data:

tbrolelogout|1575646464|454874848|2014-03-05 10:12:23|2014-03-05 10:12:23|Captain America |415|10. 236. 252. 14|1|13

P2PTrade|15454515455|2014-03-05 10:12:23|2014-03-05 10:12:23|2564128|Captain America|1545646544464|484545|Mars |4545645645674|Item-12451|5501|1 where "tbrolelogout" and "P2PTrade" representation headers of the data, and are used to mark a data type and represent a data table to which the data is to be saved during local storage; for example, "tbrolelogout" represents a data type of logout of a role, and represents that the data is to be saved to a data table with the name "tbrolelogout", and "P2PTrade" represents a data type of transaction of a role, and represents that the data is to be saved to a data table with the table name "P2PTrade".

In an embodiment, after the received data of the data storage node is decompressed, it needs to be checked whether each piece of data is accurate. A process of checking whether each piece of data is accurate includes:

checking whether data includes a header;

checking whether a data table named after the header is included in a local database, where for the two pieces of data, it is checked whether data tables with the names "tbrolelogout" and "P2PTrade" are included in the database;

checking whether a Chinese attribute value included in the data is correctly coded, where, for example, it is checked whether "Captain America" in the two pieces of data is correctly coded;

checking whether the number of attribute values included in the data is consistent with the number of columns of the data table corresponding to the header; and checking whether a type and a format of each attribute value of the data match a type and a format of a corresponding column of the corresponding data table, where the attribute values in the data correspond to the columns in the data table in sequence according to an order of arrangement; where for example, it is checked whether an attribute value, for example, time, that has a special format meets a format of a corresponding column.

Further, data that has passed all the foregoing item checks is stored into the data table corresponding to the header of the data. Finally, local warehousing integrity of the received data block is calculated as follows: the number of pieces of data that are successfully stored in the data table in the block of data/the number of pieces of data included in the table of the block of data ×100%; or local warehousing integrity of the data received by the data storage node from the application service node within a time period is calculated as follows: the number of pieces of data that are successfully stored into the data table within the period of time in the data received by the application service node/the number of pieces of data received from the application service node within the period of time×100%.

Step S406: Examine whether the data locally warehoused in the data storage node meets a data definition in the local data dictionary, and calculate, according to the number of pieces of data meeting the data definition in the local data dictionary and the number of pieces of the locally warehoused data, local warehousing accuracy of the received data in the data storage node.

It may be examined whether a length definition and a field definition in the data meet the data definition in the local data dictionary. Further, a ratio of the number of pieces of data meeting the data definition in the local data dictionary to the number of pieces of the locally warehoused data may be calculated and used as the local warehousing accuracy of the received data.

Step S408: Mark the data locally warehoused in the data storage node with a quality label, where the quality label includes the consistency result, the local warehousing integrity, and the local warehousing accuracy.

In this embodiment, it is checked whether a data content type and a data content version of received data in a data storage node are consistent with a data dictionary, local warehousing integrity and local warehousing accuracy of the received data are calculated, corresponding locally warehoused data is further marked with a quality label including the consistency result, the local warehousing integrity, and the local warehousing accuracy, and further, it may be determined according to the quality label whether to transmit the data locally warehoused in the data storage node to a data warehouse, thereby avoiding transmission of data whose quality does not meet a criterion, saving network bandwidth resources, effectively ensuring accuracy of data stored in the data warehouse, and further ensuring accuracy of a data calculation result.

In an embodiment, the method for monitoring quality of data transmission in an IDC network further includes a step: acquiring the number of pieces of data meeting the data definition in the local data dictionary in the data locally warehoused in the data storage node; and the step may be performed by the data storage node. Further, the data storage node may send the acquired number of pieces of data to the index calculation server.

In this embodiment, step S106 includes a step: calculating data transmission accuracy according to the number of pieces of data meeting the data definition in the local data dictionary and the number of pieces of data of the received data. The step may be performed by the index calculation server.

A ratio of the number of pieces of data meeting the data definition in the local data dictionary to the number of pieces of data of the received data may be calculated and used as the data transmission accuracy.

In this embodiment, the data transmission accuracy of the received data is calculated, and it may be further determined according to the data transmission accuracy whether to transmit the received data to a data warehouse, thereby avoiding transmission of the received data having low data transmission accuracy to the data warehouse, and saving network bandwidth resources.

Figures 5, 6:
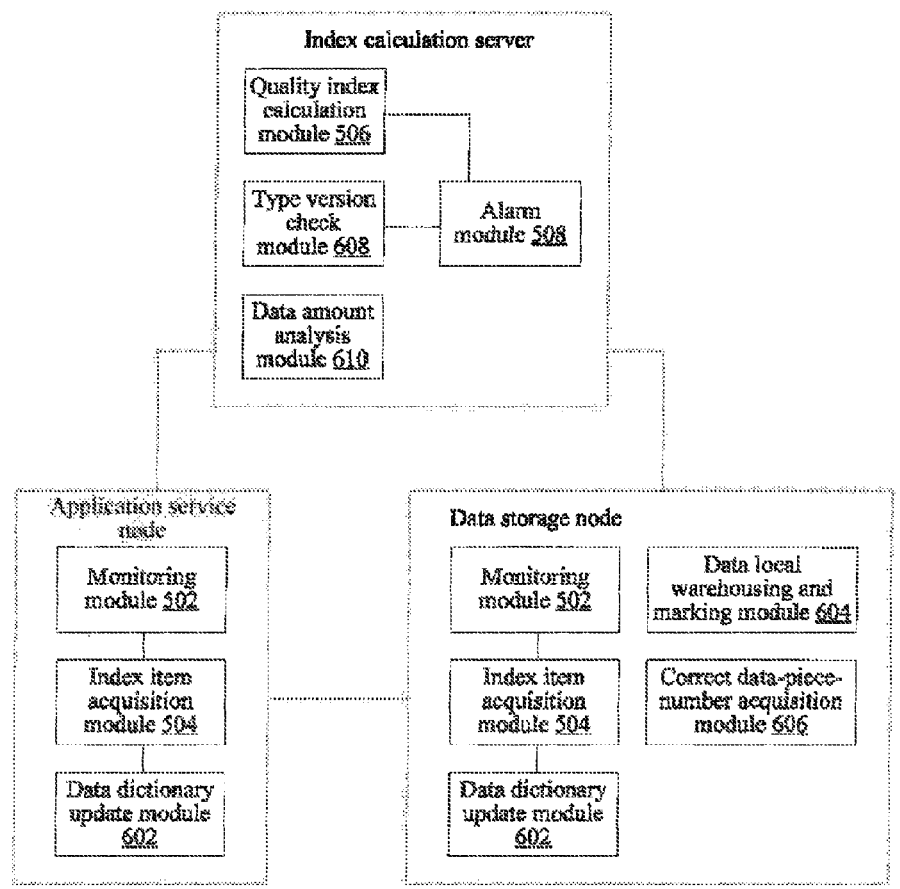
FIG. 5 is a schematic structural diagram of a system for monitoring quality of data transmission in an IDC network in an embodiment.
FIG. 6 is a schematic structural diagram of a system for monitoring quality of data transmission in an IDC network in another embodiment.

As shown in FIG. 5, in an embodiment, a system for monitoring quality of data transmission in an IDC network includes a monitoring module 502, an index item acquisition module 504, a quality index calculation module 506, and an alarm module 508. The monitoring module 502 and the index item acquisition module 504 may be operated on an application service node and a data storage node, and the quality index calculation module 506 and the alarm module 508 are may be operated on an index calculation server. In an embodiment, the application service node and the data storage node corresponding to the application service node are located in a same IDC network, while the index calculation server is located in a different IDC network from the application service node and the data storage node.

The monitoring module 502 is configured to monitor data sent by the application service node and data received by the data storage node corresponding to the application service node in the IDC network.

An application service node and a data storage node send data to and receive data from each other, and therefore the application service node corresponds to the data storage node.

In an embodiment, scripts may be deployed in advance on the application service node and the corresponding data storage node, the monitoring module 502 may monitor, by using the deployed scripts, data sent by a network transceiver port of the application service node, and monitor, by using the deployed scripts, data received by a network transceiver port of the data storage node. In the following the data that is sent is called sent data in short, and the data that is received is called received data in short.

The index item acquisition module 504 is configured to acquire specified index items of the sent data and specified index items of the received data.

The index item acquisition module 504 may acquire the specified index items by using the deployed scripts. Further, in an embodiment, the system for monitoring quality of data transmission in an IDC network further includes a sending module, and the sending module is operated on the application service node and the data storage node, and is configured to send the acquired index items to the index calculation server through the network transceiver ports by using the deployed scripts.

In an embodiment, the index items of the sent data include one or more of a belonging application service node address, a data content type, a data content version, a data serial number, a sending timestamp, the number of pieces of data, and a data amount. The index items of the received data include one or more of a belonging data storage node address, a data content type, a data content version, a data serial number, a receiving timestamp, the number of pieces of data, and a data amount. What content is specifically included in the index items of the sent data and the received data may be decided according to needs in the following specific embodiments. For example, in an embodiment, only the number of pieces of data needs to be used, and it may be regarded that in the embodiment, the index items include the number of pieces of data. In an embodiment, the data content types are categorized into game status data, game log data, payment data, and the like.

In an embodiment, the monitoring module 502 is further configured to detect a latest data dictionary change event, and the system for monitoring quality of data transmission in an IDC network further includes a data dictionary update module, configured to update, if the latest data dictionary change event is detected, local data dictionaries on the application service node and the data storage node according to the change event. The monitoring module 502 may detect, by using the deployed scripts, a latest data dictionary change event released by a data map and data dictionary management platform, so as to ensure that the local data dictionaries on the application service node and the data storage node are latest data dictionaries. The index item acquisition module 504 may acquire the data content types, the data content versions, and the like of the sent data and the received data from the local data dictionary.

The quality index calculation module 506 is configured to calculate, according to the index items of the sent data and the index items of the received data, a data transmission quality index corresponding to the sent data and the received data.

The alarm module 508 is configured to raise an exception alarm according to the data transmission quality index.

In an embodiment, the quality index calculation module 506 includes a transmission integrity calculation module, configured to calculate data transmission integrity according to the number of pieces of data of the sent data and the number of pieces of data of the received data.

The transmission integrity calculation module may calculate a ratio of the number of pieces of data of the received data to the number of pieces of data of the sent data and use the ratio as the data transmission integrity.

In this embodiment, the alarm module 508 may determine whether the data transmission integrity is less than a preset threshold, and if yes, raise an exception alarm.

In an embodiment, the quality index calculation module 506 includes a transmission delay calculation module, configured to calculate a data transmission delay according to the sending timestamp of the sent data and the receiving timestamp of the received data.

The transmission delay calculation module may calculate a difference between the receiving timestamp of the received data and the sending timestamp of the sent data and use the difference as the data transmission delay.

In this embodiment, the alarm module 508 may determine whether the data transmission delay is longer than a preset threshold, and if yes, raise an exception alarm.

The index calculation server receives the index items of the sent data on multiple application servers and the index items of the received data in the multiple data storage nodes. The quality index calculation module 506 may perform comparison and calculation on, among all the sent data and the received data, sent data and received data in which the belonging application service node address corresponds to the belonging data storage node address, the data content types are same, and the data serial numbers are same, so as to obtain the data transmission integrity or the data transmission delay. An application service node and a data storage node send data to and receive data from each other, so that an address of the application service node corresponds to an address of the data storage node. In an embodiment, the system for monitoring quality of data transmission in an IDC network further includes a data map management module, configured to store a correspondence between the application service node address and the data storage node address into a data map. The quality index calculation module 506 may acquire, according to the correspondence, a belonging data storage node address corresponding to a belonging application service node address.

In the system for monitoring quality of data transmission in an IDC network, data sent by an application service node and data received by a corresponding data storage node in an IDC network are monitored, specified index items of the sent data and specified index items of the received data are acquired, a data transmission quality index corresponding to the sent data and the received data is calculated according to the index items of the sent data and the index items of the received data, and an exception alarm is raised according to the data transmission quality index. If the data transmission quality index does not meet a criterion and an exception alarm is generated, it indicates that an error occurs in a process that the data sent by the application service node is transmitted to the data storage node, and the data in which an error has occurred may stop being transmitted to a data warehouse, thereby avoiding transmission of erroneous data that causes a waste of network bandwidth resources, and data calculation performed according to the erroneous data resulting in an erroneous data calculation result is further prevented; not only occupation of unnecessary calculation resources is avoided, but also a bad decision that is generated according to the erroneous data calculation result can be prevented.

In an embodiment, the system for monitoring quality of data transmission in an IDC network further includes a type version check module, which may be operated on the index calculation server, and is configured to check whether the data content type, the data content version, and the belonging application service node address of the sent data are consistent with a correspondence among a data content type, a data content version, and a node address stored in a latest data map and data dictionary, so as to obtain a first consistency result. The alarm module 508 is further configured to raise, if the first consistency result is inconsistent, an exception alarm.

The type version check module is further configured to check whether the data content type, the data content version, and the belonging data storage node address of the received data are consistent with a correspondence among a data content type, a data content version, and a node address stored in a latest data map and data dictionary, so as to obtain a second consistency result. The alarm module 508 is further configured to raise, if the second consistency result is inconsistent, an exception alarm.

In an embodiment, the latest data map and data dictionary is stored in a data map and data dictionary management platform. A correspondence between a belonging application service node address and a data content type and a correspondence between a belonging data storage node address and a data content type are stored in the data map, and are used to represent a content type of data deployed on each application service node and a content type of data deployed on each data storage node. A correspondence between a data content type and a data content version is stored in the data dictionary, and is used to represent a latest version (data content version) of each data content type.

The type version check module may search the data map according to the belonging application service node address of the sent data for a corresponding data content type, and find through comparison whether the found data content type and the data content type of the sent data are consistent; and search the data dictionary according to the data content type of the sent data for a corresponding data content version, and find through comparison whether the found data content version and the data content version of the sent data are consistent. Similarly, the type version check module may correspondingly obtain the second consistency result, and is no longer elaborated here.

In an aspect, versions of Internet application services are updated at a very fast speed, and correspondingly, a correspondence between a latest data content type and a data content version stored in the data dictionary also changes rapidly. In another aspect, the number of the data storage nodes changes with that of the application service nodes, the content types of data deployed on each application service node and each data storage node may also change, and correspondingly, the correspondence between the data content type and the IDC node address stored in the data map may also change often. Therefore, it is very necessary to check whether the data content types, the data content versions, and the corresponding IDC node addresses of the sent data and the received data meet a latest data map and data dictionary. In this embodiment, if the data content type, the data content version, and the corresponding IDC node address of the sent data or the received data do not meet a latest data map and data dictionary, an exception alarm is raised, and further data in which the latest data map and data dictionary is not met may stop being transmitted to a data warehouse, thereby avoiding transmission of erroneous data and saving network bandwidth resources.

In an embodiment, the system for monitoring quality of data transmission in an IDC network further includes a data amount analysis module, and the data amount analysis module may also be operated on the index calculation server, and is configured to analyze a data amount of the sent data of the application service node within a specified time period, and acquire an amount fluctuation of the sent data of the application service node.

The data amount analysis module is further configured to analyze a data amount of the received data of the data storage node within a specified time period, and acquire an amount fluctuation of the received data of the data storage node.

If a data amount of the sent data or the received data of the data storage node of the application service node within a time period has a large fluctuation, an exception problem may exist, the data amount analysis module may further analyze a reason why the data amount has a large fluctuation, and determine according to the reason whether to further send corresponding data to a data warehouse, thereby avoiding transmission of data in which an exception occurs and saving network bandwidth resources.

In an embodiment, the system for monitoring quality of data transmission in an IDC network further includes a data local warehousing and marking module, configured to local warehouse and mark the received data of the data storage node. The data local warehousing and marking module includes a type version check module, a local warehousing module, a warehousing integrity calculation module, a warehousing accuracy calculation module, and a label marking module. In an embodiment, the data local warehousing and marking module may be operated on the data storage node.

The type version check module is configured to check whether the data content type and the data content version of the received data in the data storage node are consistent with a correspondence between a data content type and a data content version in a local data dictionary in the data storage node, so as to obtain a third consistency result.

The local warehousing module is configured to decompress the received data of the data storage node, and locally warehouse the successfully decompressed data in the data storage node.

The warehousing integrity calculation module is configured to calculate local warehousing integrity of the received data according to the number of pieces of the locally warehoused data and the number of pieces of data of the received data. The warehousing integrity calculation module may calculate a ratio of the number of pieces of the local stored data to the number of pieces of data of the received data and use the ratio as the local warehousing integrity of the received data.

The warehousing accuracy calculation module is configured to examine whether the data locally warehoused on the data storage node meets a data definition in a local data dictionary, and calculate local warehousing accuracy of the received data in the data storage node according to the number of pieces of data meeting the data definition in the local data dictionary and the number of pieces of the locally warehoused data. The warehousing accuracy calculation module may examine whether a length definition and a field definition in the data meet the data definition in the local data dictionary. Further, the warehousing accuracy calculation module may calculate a ratio of the number of pieces of data meeting the data definition in the local data dictionary to the number of pieces of the locally warehoused data and use the ratio as the local warehousing accuracy of the received data.

The label marking module is configured to mark the data locally warehoused in the data storage node with a quality label, where the quality label includes the consistency result, the local warehousing integrity, and the local warehousing accuracy.

In this embodiment, it is checked whether a data content type and a data content version of received data in a data storage node are consistent with a data dictionary, local warehousing integrity and local warehousing accuracy of the received data are calculated, corresponding locally warehoused data is further marked with a quality label including the consistency result, the local warehousing integrity, and the local warehousing accuracy, and further, it may be determined according to the quality label whether to transmit the data locally warehoused in the data storage node to a data warehouse, thereby avoiding transmission of data whose quality does not meet a criterion, saving network bandwidth resources, effectively ensuring accuracy of data stored in the data warehouse, and further ensuring accuracy of a data calculation result.

In an embodiment, the system for monitoring quality of data transmission in an IDC network further includes a correct data-piece-number acquisition module, configured to acquire the number of pieces of data meeting a data definition in a local data dictionary in the data locally warehoused in the data storage node. The correct data-piece-number acquisition module may be operated on the data storage node. The sending module on the data storage node may send the acquired number of pieces of data to the index calculation server.

In this embodiment, the quality index calculation module 506 further includes a transmission accuracy calculation module, configured to calculate data transmission accuracy according to the number of pieces of data meeting the data definition in the local data dictionary and the number of pieces of data of the received data.

The transmission accuracy calculation module may calculate a ratio of the number of pieces of data meeting the data definition in the local data dictionary to the number of pieces of data of the received data and use the ratio as the data transmission accuracy.

In this embodiment, the data transmission accuracy of the received data is calculated, and it may be further determined according to the data transmission accuracy whether to transmit the received data to a data warehouse, thereby avoiding transmission of the received data having low data transmission accuracy to the data warehouse, and saving network bandwidth resources.

FIG. 6 is a schematic structural diagram of a system for monitoring quality of data transmission in an IDC network in an embodiment. The system for monitoring quality of data transmission in an IDC network includes a monitoring module 502, an index item acquisition module 504, a data dictionary update module 602, a data local warehousing and marking module 604, a correct data-piece-number acquisition module 606, a quality index calculation module 506, an alarm module 508, a type version check module 608, and a data amount analysis module 610. The monitoring module 502, the index item acquisition module 504, and the data dictionary update module 602 are operated on an application service node and a data storage node, the data local warehousing and marking module 604 and the correct data-piece-number acquisition module 606 are operated on the data storage node, and the quality index calculation module 506, the alarm module 508, the type version check module 608, and the data amount analysis module 610 are operated on an index calculation server. The functional modules in this embodiment have the same functions as the functional modules with corresponding module names in the foregoing, and are no longer elaborated here.

Figure 7:
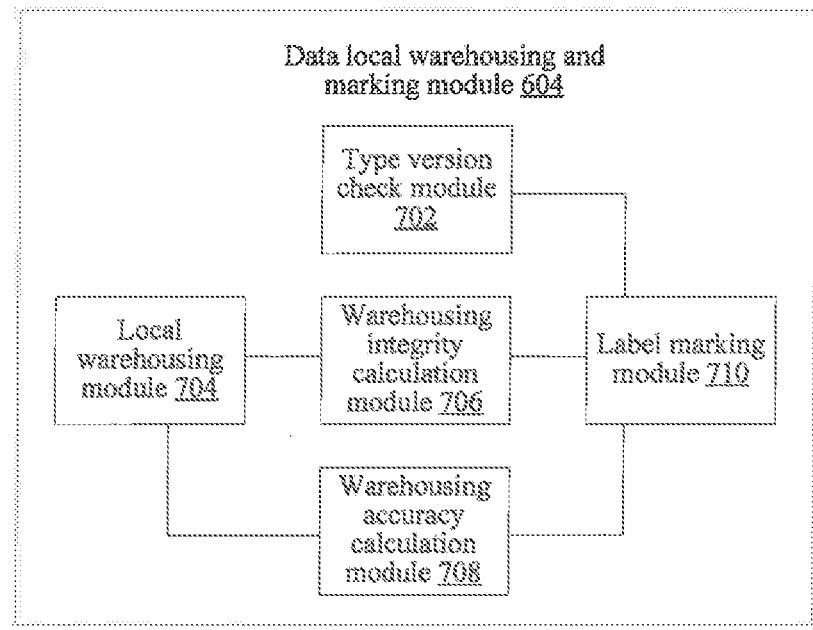
FIG. 7 is a schematic structural diagram of a data local warehousing and marking module in an embodiment.

FIG. 7 is a schematic structural diagram of a data local warehousing and marking module in an embodiment. The data local warehousing and marking module 604 includes a type version check module 702, a local warehousing module 704, a warehousing integrity calculation module 706, a warehousing accuracy calculation module 708, and a label marking module 710. The functional modules in this embodiment have the same functions as the functional modules with corresponding module names in the foregoing, and are no longer elaborated here.

Figure 8:
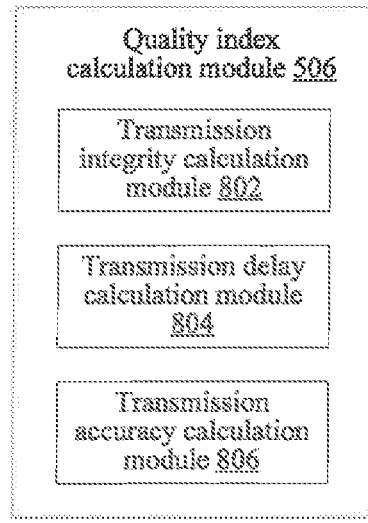
FIG. 8 is a schematic structural diagram of a quality index calculation module in an embodiment.

FIG. 8 is a schematic structural diagram of a quality index calculation module in an embodiment. The quality index calculation module includes a transmission integrity calculation module 802, a transmission delay calculation module 804, and a transmission accuracy calculation module 806. The functional modules in this embodiment have the same functions as the functional modules with corresponding module names in the foregoing, and are no longer elaborated here.

Figure 9:
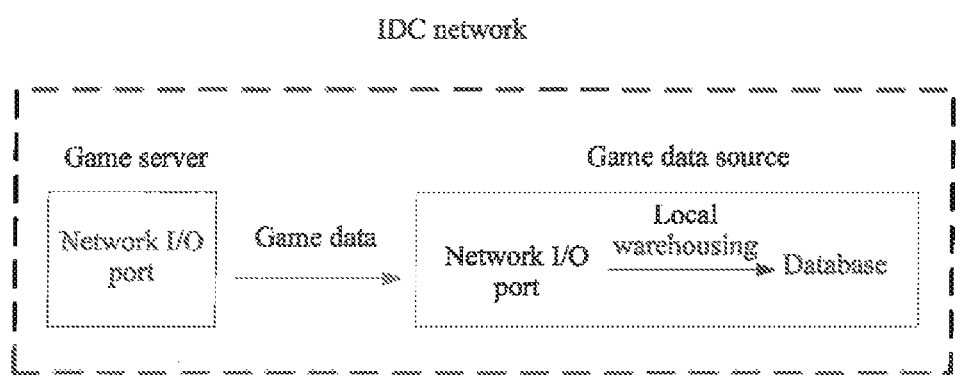
FIG. 9 is a schematic diagram of data transmission in an IDC network.

FIG. 9 is a schematic diagram of data transmission in an IDC network. In FIG. 9, a game server is equivalent to an application server, and a game data source is equivalent to a data storage node. A network I/O port of the game server sends game data to the game data source through a network, and a network I/O port of the game data source receives the game data, and locally warehouses the game data in a database.

The foregoing embodiments only describe several implementation manners of the present disclosure, and their description is specific and detailed, but cannot therefore be understood as a limitation to the patent scope of the present disclosure. It should be noted that a person of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A method for monitoring quality of data transmission in an Internet data center (IDC) network, comprising the following steps:
    monitoring data sent by an application service node and data received by a data storage node corresponding to the application service node in an IDC network;
    acquiring specified index items of the sent data and specified index items of the received data wherein the acquired index items of the received data comprise the number of pieces of data, a data content type, and a data content version;
    calculating, according to the index items of the sent data and the index items of the received data, a data transmission quality index corresponding to the sent data and the received data; and
    raising an exception alarm according to the data transmission quality index;
    checking whether the data content type and the data content version of the received data in the data storage node are consistent with a correspondence between a data content type and a data content version in a local data dictionary in the data storage node, so as to obtain a third consistency result;
    decompressing the received data of the data storage node, locally warehousing the successfully decompressed data in the data storage node, and calculating local warehousing integrity of the received data according to the number of pieces of the locally warehoused data and the number of pieces of data of the received data; and
    examining whether the data locally warehoused in the data storage node meets a data definition in the local data dictionary, and calculating local warehousing accuracy of the received data in the data storage node according to the number of pieces of data meeting the data definition in the local data dictionary and the number of pieces of the locally warehoused data.

2. The method for monitoring quality of data transmission in an IDC network according to claim 1, wherein the index items of the sent data and the received data comprise the number of pieces of data; and
    the step of calculating, according to the index items of the sent data and the index items of the received data, the data transmission quality index between the application service node and the corresponding data storage node comprises:
    calculating data transmission integrity according to the number of pieces of data of the sent data and the number of pieces of data of the received data.

3. The method for monitoring quality of data transmission in an IDC network according to claim 1, wherein the index items of the sent data comprise a sending timestamp, and the index items of the received data comprise a receiving timestamp; and the step of calculating, according to the index items of the sent data and the index items of the received data, the data transmission quality index between the application service node and the corresponding data storage node comprises:
    calculating a data transmission delay according to the sending timestamp of the sent data and the receiving timestamp of the received data.

4. The method for monitoring quality of data transmission in an IDC network according to claim 1, wherein the index items of the sent data comprise a data content type, a data content version, and a belonging application service node address; and
    the method further comprises a step:
    checking whether the data content type, the data content version, and the belonging application service node address of the sent data are consistent with a correspondence among a data content type, a data content version, and a node address stored in a latest data map and data dictionary, and if not, raising the exception alarm.

5. The method for monitoring quality of data transmission in an IDC network according to claim 1, wherein the index items of the received data comprise the data content type, the data content version, and a belonging data storage node address; and
    the method further comprises a step:
    checking whether the data content type, the data content version, and the belonging data storage node address of the received data are consistent with a correspondence among a data content type, a data content version, and a node address stored in a latest data map and data dictionary, and if not, raising the exception alarm.

6. The method for monitoring quality of data transmission in an IDC network according to claim 1, wherein the index items of the sent data and the received data comprise a data amount; and
    the method further comprises steps:
    analyzing the data amount of the sent data of the application service node within a specified time period, and acquiring an amount fluctuation of the sent data of the application service node; and
    analyzing the data amount of the received data of the data storage node within a specified time period, and acquiring an amount fluctuation of the received data of the data storage node.

7. The method for monitoring quality of data transmission in an IDC network according to claim 1, wherein the method further comprises a step:
    marking the data locally warehoused in the data storage node with a quality label, wherein the quality label comprises the third consistency result, the local warehousing integrity, and the local warehousing accuracy.

8. The method for monitoring quality of data transmission in an IDC network according to claim 1, wherein the method further comprises steps:
    acquiring the number of pieces of data meeting the data definition in the local data dictionary in the data locally warehoused in the data storage node; and
    the step of calculating, according to the index items of the sent data and the index items of the received data, the data transmission quality index between the application service node and the corresponding data storage node comprises:

calculating data transmission accuracy according to the number of pieces of data meeting the data definition in the local data dictionary and the number of pieces of data of the received data.

9. A system for monitoring quality of data transmission in an Internet data center (IDC) network, comprising:
a processor: and
a memory connected to the processor, the memory comprising a plurality of program instructions executable by the processor, the plurality of program instructions comprising:
a monitoring module, configured to cause the processor to monitor data sent by an application service node and data received by a data storage node corresponding to the application service node in an IDC network;
an index item acquisition module, configured to cause the processor to acquire specified index items of the sent data and specified index items of the received data, wherein the acquired index items of the received data comprise the number of pieces of data, a data content type, and a data content version;
a quality index calculation module, configured to cause the processor to calculate, according to the index items of the sent data and the index items of the received data, a data transmission quality index corresponding to the sent data and the received data; and
an alarm module, configured to cause the processor to raise an exception alarm according to the data transmission quality index
a type version check module, configured to cause the processor to check whether the data content type and the data content version of the received data in the data storage node are consistent with a correspondence between a data content type and a data content version in a local data dictionary in the data storage node, so as to obtain a third consistency result;
a local warehousing module, configured to cause the processor to decompress the received data of the data storage node, and locally warehouse the successfully decompressed data in the data storage node;
a warehousing integrity calculation module, configured to cause the processor to calculate local warehousing integrity of the received data according to the number of pieces of the locally warehoused data and the number of pieces of data of the received data; and
a warehousing accuracy calculation module, configured to cause the processor to examine whether the data locally warehoused in the data storage node meets a data definition in the local data dictionary, and calculate local warehousing accuracy of the received data in the data storage node according to the number of pieces of data meeting the data definition in the local data dictionary and the number of pieces of the locally warehoused data.

10. The system for monitoring quality of data transmission in an IDC network according to claim 9, wherein the index items of the sent data and the received data comprise the number of pieces of data; and
the quality index calculation module comprises a transmission integrity calculation module, configured to cause the processor to calculate data transmission integrity according to the number of pieces of data of the sent data and the number of pieces of data of the received data.

11. The system for monitoring quality of data transmission in an IDC network according to claim 9, wherein the index items of the sent data comprise a sending timestamp, and the index items of the received data comprise a receiving timestamp; and
the quality index calculation module comprises a transmission delay calculation module, configured to cause the processor to calculate a data transmission delay according to the sending timestamp of the sent data and the receiving timestamp of the received data.

12. The system for monitoring quality of data transmission in an IDC network according to claim 9, wherein the index items of the sent data comprise a data content type, a data content version, and a belonging application service node address;
the system further comprises a type version check module, configured to cause the processor to check whether the data content type, the data content version, and the belonging application service node address of the sent data are consistent with a correspondence among a data content type, a data content version, and a node address stored in a latest data map and data dictionary, so as to obtain a first consistency result; and
the alarm module is further configured to cause the processor to raise, if the first consistency result is inconsistent, the exception alarm.

13. The system for monitoring quality of data transmission in an IDC network according to claim 12, wherein the index items of the received data comprise the data content type, the data content version, and a belonging data storage node address;
the type version check module is further configured to cause the processor to check whether the data content type, the data content version, and the belonging data storage node address of the received data are consistent with a correspondence among a data content type, a data content version, and a node address stored in a latest data map and data dictionary, so as to obtain a second consistency result; and
the alarm module is further configured to cause the processor to raise, if the second consistency result is inconsistent, the exception alarm.

14. The system for monitoring quality of data transmission in an IDC network according to claim 10, wherein the index items of the sent data and the received data comprise a data amount;
the system further comprises a data amount analysis module, configured to cause the processor to analyze the data amount of the sent data of the application service node within a specified time period, and acquire an amount fluctuation of the sent data of the application service node; and
the data amount analysis module is further configured to cause the processor to analyze the data amount of the received data of the data storage node within a specified time period, and acquire an amount fluctuation of the received data of the data storage node.

15. The system for monitoring quality of data transmission in an IDC network according to claim 9, wherein the system further comprises:
a label marking module, configured to cause the processor to mark the data locally warehoused in the data storage node with a quality label, wherein the quality label comprises the third consistency result, the local warehousing integrity, and the local warehousing accuracy.

16. The system for monitoring quality of data transmission in an IDC network according to claim 9, wherein the system further comprises a correct data-piece-number acquisition module, configured to cause the processor to acquire the number of pieces of data meeting the data definition in the local data dictionary in the data locally warehoused in the data storage node; and the quality index calculation module further comprises a transmission accuracy calculation module, configured to cause the processor to calculate data transmission accuracy according to the number of pieces of data meeting the data definition in the local data dictionary and the number of pieces of data of the received data.

* * * * *